(12) United States Patent
Ramakrishnan et al.

(10) Patent No.: US 11,124,650 B2
(45) Date of Patent: Sep. 21, 2021

(54) FLAME RETARDANT COMPOSITIONS

(71) Applicant: SHPP Global Technologies B.V., Bergen op Zoom (NL)

(72) Inventors: Vaidyanath Ramakrishnan, Bergen op Zoom (NL); Johannes Gerardus Petrus Goossens, Bergen op Zoom (NL); Johannes Martinus Dina Goossens, Bergen op Zoom (NL)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/980,620

(22) PCT Filed: Mar. 12, 2019

(86) PCT No.: PCT/IB2019/052011
§ 371 (c)(1),
(2) Date: Sep. 14, 2020

(87) PCT Pub. No.: WO2019/175778
PCT Pub. Date: Sep. 19, 2019

(65) Prior Publication Data
US 2021/0017385 A1 Jan. 21, 2021

Related U.S. Application Data

(60) Provisional application No. 62/643,272, filed on Mar. 15, 2018.

(30) Foreign Application Priority Data

Apr. 11, 2018 (EP) .................................... 18166853

(51) Int. Cl.
| | |
|---|---|
| *C08L 83/06* | (2006.01) |
| *C08J 7/04* | (2020.01) |
| *C08L 27/18* | (2006.01) |
| *C08K 3/04* | (2006.01) |
| *C08K 3/36* | (2006.01) |
| *C08K 7/02* | (2006.01) |
| *C08K 3/22* | (2006.01) |

(52) U.S. Cl.
CPC .................. *C08L 83/06* (2013.01); *C08J 7/04* (2013.01); *C08L 27/18* (2013.01); *C08J 2325/14* (2013.01); *C08J 2327/18* (2013.01); *C08J 2483/06* (2013.01); *C08K 3/04* (2013.01); *C08K 3/36* (2013.01); *C08K 7/02* (2013.01); *C08K 2003/2241* (2013.01); *C08K 2201/005* (2013.01); *C08K 2201/011* (2013.01); *C08L 2201/02* (2013.01)

(58) Field of Classification Search
CPC ........ C08L 83/06; C08L 83/04; C08L 69/005; C08L 2666/18; C08L 2666/58; C08L 27/18; C08J 2483/04; C08J 2483/06; C08J 2483/07; C08J 2369/00; C08J 2327/18; C08J 2325/14; C08K 3/04; C08K 3/36; C08K 5/0066; C08K 5/5399; C08K 13/02; C08K 13/06; C08K 2201/005; C08K 2201/011; C09K 2003/1078; C09K 21/00; C09K 21/02; C09K 21/06; C09K 21/14; C09K 21/08
See application file for complete search history.

(56) References Cited

U.S. PATENT DOCUMENTS

| | | | | |
|---|---|---|---|---|
| 7,268,176 B2* | 9/2007 | Ambrose | ............... | B82Y 30/00 524/262 |
| 8,415,430 B2* | 4/2013 | Kuhn | ...................... | C08K 3/36 525/88 |
| 2007/0129492 A1 | 6/2007 | Colborn et al. | | |
| 2007/0135589 A1* | 6/2007 | DeRudder | ............... | C08L 69/00 525/464 |
| 2008/0167414 A1* | 7/2008 | Biswas | ................... | C08L 69/00 524/437 |
| 2008/0276497 A1* | 11/2008 | Chou | .................... | B32B 27/205 36/30 A |

FOREIGN PATENT DOCUMENTS

| | | |
|---|---|---|
| EP | 1731572 A1 | 12/2006 |
| JP | 2015-115494 A | 6/2015 |

* cited by examiner

*Primary Examiner* — Jane L Stanley
(74) *Attorney, Agent, or Firm* — Quicker Law, LLC

(57) ABSTRACT

In an embodiment, a composition comprises a poly(ester-carbonate-siloxane) copolymer; a nanosilica; a plurality of polysiloxane particles; and a fluoropolymer. The nanosilica can be present in an amount of 1 to 5 wt % based on a total weight of the composition. The nanosilica can have a $D_{50}$ particle size by volume of 5 to 50 nanometers. The nanosilica can have a hydrophobic coating. The plurality of polysiloxane particles can be present in an amount of 1 to 10 wt % based on a total weight of the composition. The plurality of polysiloxane particles can have a $D_{50}$ particle size by volume of 0.1 to 10 micrometers. The fluoropolymer can be present in an amount of 0.005 to 5 wt % based on a total weight of the composition.

16 Claims, No Drawings

FLAME RETARDANT COMPOSITIONS

CROSS-REFERENCE TO RELATED APPLICATION

This application is the National Stage of International Application No. PCT/IB2019/052011 filed Mar. 12, 2019, which claims priority to and the benefit of U.S. Provisional Application Ser. No. 62/643,272 filed Mar. 15, 2018, and European Application 18166853.4 filed Apr. 11, 2018. The related applications are incorporated herein in their entirety by reference.

BACKGROUND

Flame retardant polycarbonate compositions capable of achieving a ULV0 rating at 1 millimeter (mm) in accordance with the Underwriters Laboratories flammability testing are widely prepared and used, especially in a wide variety of electrical and electronic applications. However, only a very limited set of polycarbonate compositions are capable of achieving a UL94 V0 rating at thicknesses less than 1 mm, for example, at 0.6 mm, or at 0.4 mm. Furthermore, an even more limited set of polycarbonates are used in aircraft and other transportation applications as interior parts in these applications must meet stringent flammability safety requirements including smoke density, flame spread, and heat release values that the polycarbonate compositions must meet have been implemented. For example, in the United States, Federal Aviation Regulation (FAR) Part 25.853 sets forth the airworthiness standards for aircraft compartment interiors. The safety standards for aircraft and transportation systems used in the United States include a smoke density test specified in FAR 25.5 Appendix F, Part V Amdt 25-116. Flammability requirements include the "60 second test" specified in FAR 25.853(a) Appendix F, Part I, (a),1,(i) and the heat release rate standard (referred to as the Ohio State University (OSU) 65/65 standard) described in FAR F25.4 (FAR Section 25, Appendix F, Part IV), or the French flame retardant tests such as, NF-P-92-504 (flame spread) or NF-P-92-505 (drip test). Likewise, the European Union has approved the introduction of a new harmonized fire standard for rail applications, namely EN-45545, to replace all currently active different standards in each member state. This norm will impose stringent requirements on smoke density and heat release properties allowed for materials used in these applications. These flammability safety requirements have been implemented so that in the event of a fire, components made from materials meeting these requirements can increase the amount of time available for escape and can provide for better visibility during a fire.

In view of the current interior material safety standards, and in anticipation of more stringent standards in the future, materials that exceed governmental and aircraft manufacturer flame safety requirements are sought.

BRIEF SUMMARY

Disclosed herein is a polycarbonate composition having improved flame retardant properties.

In an embodiment, a composition comprises a poly(ester-carbonate-siloxane) copolymer; a nanosilica; a plurality of polysiloxane particles; and a fluoropolymer. The nanosilica can be present in an amount of 1 to 5 wt % based on a total weight of the composition. The nanosilica can have a $D_{50}$ particle size by volume of 5 to 50 nanometers. The nanosilica can have a hydrophobic coating. The plurality of polysiloxane particles can be present in an amount of 1 to 10 wt % based on a total weight of the composition. The plurality of polysiloxane particles can have a $D_{50}$ particle size by volume of 0.1 to 10 micrometers. The fluoropolymer can be present in an amount of 0.005 to 5 wt % based on a total weight of the composition.

The above described and other features are exemplified by the following detailed description and claims.

DETAILED DESCRIPTION

It was discovered that a surprising synergy arises in a composition comprising a poly(ester-carbonate-siloxane) copolymer, a nanosilica, and a plurality of polysiloxane particles in that the composition can achieve excellent flame retardancy and smoke density values without the incorporation of a flame retardant. For example, the composition can achieve a ULV0 rating at a thickness of 0.8 mm, or 0.6 mm, or 0.4 mm as tested in accordance with the procedure of Underwriter's Laboratory Bulletin 94 entitled "Tests for Flammability of Plastic Materials, UL94" with 7 day conditioning. The composition can achieve a peak heat release rate (PHHR) of less than 170 watts per gram (W/g), or less than or equal to 168 W/g, or 150 to 165 W/g as determined in accordance with ASTM D7309-13, method A at a temperature ramp of 1 degrees Celsius per second (° C./s). The composition can pass the OSU 65/65 test achieving a 2 minute integrated heat release rate of less than or equal to 65 kilowatt-minutes per square meter (kW-min/m²) and a peak heat release rate of less than 65 kW/m². The composition can pass the OSU 55/55 test achieving a 2 minute integrated heat release rate of less than or equal to 55 kW-min/m² and a peak heat release rate of less than 55 kW/m². The composition can achieve a smoke density after 4 minutes (DS4) of less than 150 kW/m² and an integral of the smoke density as a function of time up to 4 minutes (VOF4) of less than 300 kW/m² determined in accordance with ISO 5659-2 using on a 3 mm thick plaque.

The composition comprises a poly(ester-carbonate-siloxane) copolymer. The a poly(ester-carbonate-siloxane) copolymer comprises carbonate repeat units, ester repeat units, and siloxane repeat units. The carbonate repeat units have the formula (1),

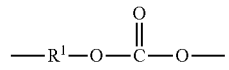

(1)

wherein at least 60 percent of the total number of $R^1$ groups are aromatic, or each $R^1$ contains at least one $C_{6-30}$ aromatic group. The carbonate repeat unit can be derived from dihydroxy compounds that are described, for example, in WO 2013/175448 A1, U.S. 2014/0295363, and WO 2014/072923. The carbonate repeat units can be derived from bisphenol compounds such as at least one of 2,2-bis(4-hydroxyphenyl) propane ("bisphenol-A" or "BPA"), 3,3-bis(4-hydroxyphenyl) phthalimidine, 1,1-bis(4-hydroxy-3-methylphenyl)cyclohexane, or 1,1-bis(4-hydroxyphenyl)-3,3,5-trimethylcyclohexane (isophorone). The carbonate repeat units can be derived from bisphenol compounds such as at least one of resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, or 1,1-bis(4-hydroxyphenyl)-3,3,5-trimethylcyclohexane (isophorone bisphenol).

The ester repeat units can have the formula (4),

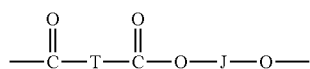

(4)

wherein J is a divalent group derived from a dihydroxy compound (which includes a reactive derivative thereof), and can be, for example, a $C_{2-10}$ alkylene, a $C_{6-20}$ cycloalkylene, a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene.

The ester repeat units can be derived from aromatic dihydroxy compounds of such as at least one of resorcinol, a bisphenol (such as bisphenol A), a $C_{1-8}$ aliphatic diol (such as ethane diol, n-propane diol, i-propane diol, 1,4-butane diol, 1,6-cyclohexane diol, or 1,6-hydroxymethylcyclohexane), decanedioic acid (sebacic acid), an alpha, omega-$C_{12}$ dicarboxylic acid (such as dodecanedioic acid (DDDA)), or an aromatic dicarboxylic acid (such as terephthalic acid, isophthalic acid, naphthalene dicarboxylic acid, or 1,6-cyclohexane dicarboxylic acid). The ester repeat units can be derived from a combination of isophthalic acid and terephthalic acid, wherein the weight ratio of isophthalic acid to terephthalic acid 91:9 to 2:98, to 75:25 to 25:75 can be used.

Specific ester units include ethylene terephthalate units, n-propylene terephthalate units, n-butylene terephthalate units, ester units derived from isophthalic acid, terephthalic acid, and resorcinol (ITR ester units), or ester units derived from sebacic acid and bisphenol A.

The molar ratio of ester units to carbonate units in poly(ester-carbonate-siloxane) copolymer can vary broadly, for example, 1:99 to 99:1, or 10:90 to 90:10, or 25:75 to 75:25, or 2:98 to 15:85.

The siloxane repeat units can have the formula (10),

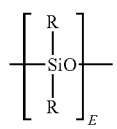

(10)

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkyl, $C_{7-13}$ aralkoxy, $C_{7-13}$ alkylaryl, or $C_{7-13}$ alkylaryloxy. The foregoing groups can be fully or partially halogenated with fluorine, chlorine, bromine, or iodine, or a combination thereof. The siloxane repeat units can be free of a halogen. Combinations of the foregoing R groups can be used in the same copolymer.

The value of E in formula (10) can vary widely depending on the type and relative amount of each component in the composition, the desired properties of the composition, and like considerations. Generally, E has an average value of 2 to 1,000, or 2 to 500, 2 to 200, or 2 to 125, 5 to 80, or 10 to 70. E can have an average value of 10 to 80, or 10 to 40, or 40 to 80, or 40 to 70.

The siloxane repeat units can have the formula (11),

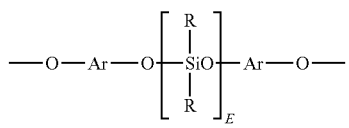

(11)

wherein E is as defined above; each R can be the same or different, and is as defined above; and Ar can be the same or different, and is a substituted or unsubstituted $C_{6-30}$ arylene, wherein the bonds are directly connected to an aromatic moiety. Ar groups in formula (11) can be derived from a $C_{6-30}$ dihydroxyarylene compound. Examples of dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), or 1,1-bis(4-hydroxy-t-butylphenyl) propane. Combinations comprising at least one of the foregoing dihydroxy compounds can also be used.

The siloxane repeat units can have the formula (13),

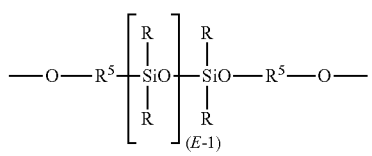

(13)

wherein R and E are as described above, and each $R^5$ is independently a divalent $C_{1-30}$ organic group, and wherein the polymerized polysiloxane unit is the reaction residue of its corresponding dihydroxy compound.

The siloxane repeat units can have the formula (14),

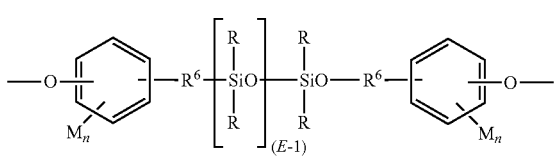

(14)

wherein R and E are as defined above. $R^6$ in formula (14) is a divalent $C_{2-8}$ aliphatic. Each M in formula (14) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4.

M can be bromo or chloro, an alkyl (such as methyl, ethyl, or propyl), an alkoxy (such as methoxy, ethoxy, or propoxy), or an aryl (such as phenyl, chlorophenyl, or tolyl); $R^6$ can be a dimethylene, trimethylene or tetramethylene; and R can be a $C_{1-8}$ alkyl, haloalkyl (such as trifluoropropyl or cyanoalkyl), or aryl (such as phenyl, chlorophenyl, or tolyl). R can be methyl, or a combination of methyl and trifluoropropyl, or a combination of methyl and phenyl. R can be methyl, M can be methoxy, n can be one, and $R^6$ can be a divalent $C_{1-3}$ aliphatic group.

Specific polydiorganosiloxane blocks are of the formula (14a), (14b), and (14c).

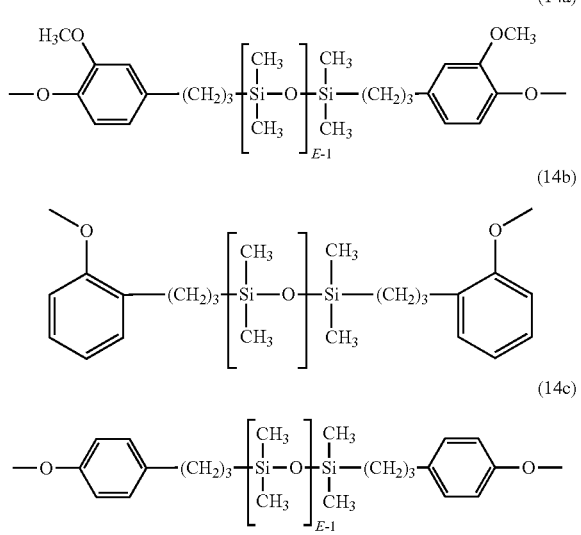

The poly(ester-carbonate-siloxane) can comprise bisphenol A carbonate units, isophthalate-terephthalate-bisphenol A ester units, and siloxane units, for example, blocks containing 5 to 200 dimethylsiloxane units, such as those commercially available under the trade name FST from SABIC's Innovative Plastics Business.

The poly(ester-carbonate-siloxane) can have a weight average molecular weight of 10,000 to 50,000 grams per mole (g/mol), or 20,000 to 40,000 g/mol based on polycarbonate standards.

The composition can comprise 60 to 99 weight percent (wt %), or 85 to 98 wt %, or 90 to 95 wt % of the poly(ester-carbonate-siloxane) based on the total weight of the composition.

The composition can comprise a polycarbonate. "Polycarbonate" as used herein means a homopolymer or copolymer having repeating structural carbonate units of the formula (1), where it is noted that if the composition comprises a copolycarbonate it is different from the poly(ester-carbonate-siloxane). The polycarbonate can comprise a homopolymer derived from BPA. The polycarbonate can comprise a copolymer derived from BPA and another bisphenol or dihydroxy aromatic compound such as resorcinol.

The composition comprises nanosilica. The nanosilica can have a hydrophobic coating. The nanosilica can comprise a solid silica. The nanosilica can comprise at least one of a fused silica or a fumed silica. The nanosilica can comprise at least one of a crystalline silica or an amorphous silica. Examples of solid silica include attapulgite, e.g., Min-U-Gel™ commercially available from Active Minerals International, Ultrasil™ commercially available from Degussa Corporation, and Davisil™-643 commercially available from Sigma-Aldrich. The nanosilica can comprise a high purity nanosilica, where 'high purity nanosilica' is a nanosilica that comprises greater than or equal to 70 wt %, or greater than or equal to 80 wt %, 90 to 100 wt % of silica oxide, based on the total weight of the nanosilica. The nanosilica can have a $D_{50}$ particle size by volume of 5 to 50 nanometers (nm), or 5 to 40 nm, or 15 to 25 nm. The composition can comprise 1 to 5 wt %, or 2.5 to 4.5 wt %, or 3 to 4 wt % of the nanosilica based on the total weight of the composition.

The hydrophobic coating can comprise at least one of an organosiloxane or an organosilane. The organosiloxane can comprise at least one of an oligomeric linear siloxane (such as polydimethylsiloxane or polyphenylmethylsiloxane) or a cyclic siloxane (such as octamethyltetrasiloxane or hexamethyltrisiloxane). The hydrophobic coating can comprise a polysiloxane graft that can be comprise an organosiloxane (such as polydimethylsiloxane) grafted onto a surface of the nanosilica. The organosilane can comprise at least one of phenyltrimethoxysilane, diphenyldimethoxysilane, polyethyleneglycoltrimethoxysilane, phenethyltrimethoxysilane, gamma-methacryloxypropyltrimethoxysilane, gamma-aminopropyltrimethoxysilane, glycidyloxypropyltrimethoxysilane, N-aminoethyl-3-aminopropyltrimethoxysilane, aminoethylaminopropylmethyldimethoxysilane, aminoethylaminopropyltrimethoxysilane, methyltrimethoxysilane, methyltriethoxysilane, mercaptopropyltrimethoxysilane, mercaptopropylmethyldimethoxysilane, chloropropyltrimethoxysilane, chloropropyltriethoxysilane, phenyltriethoxysilane, chloropropylmethyldimethoxysilane, diphenyldiethoxysilane, phenyltriethoxysilane, polyethyleneglycoltriethoxysilane, gamma-methacryloxypropyltriethoxysilane, gamma-aminopropyltriethoxysilane, glycidyloxypropyltriethoxysilane, or N-aminoethyl-3-aminopropyltriethoxysilane. The hydrophobic coating component can be added to the silica prior to or during formation of the composition.

The composition comprises a plurality of polysiloxane particles. The composition can comprise 1 to 10 wt %, or 1 to 5 wt %, or 2 to 6 wt % of the plurality of polysiloxane particles based on the total weight of the composition. The polysiloxane particles can be in the shape of at least one of spherical, oblong, ovoid, or cylindrical. Specifically, the polysiloxane particles can be spherical in shape. The polysiloxane particles can have a $D_{50}$ particle size by volume of 0.1 to 10 micrometers, or 1 to 5 micrometers. As used herein, the $D_{50}$ particle size can be determined in accordance with ISO-22412-17. The bulk specific gravity of the polysiloxane particles can be 0.35 to 0.67 kilograms per liter (kg/L).

The polysiloxane particles can comprise a three-dimensional polymer chain of the formula (I):

in which x is a positive number greater than or equal to 1, or 1 to 1.9, or 1 to 1.5, or 1 to 1.2; and each R is independently is defined above. R in formula (I) can be an aliphatic hydrocarbon group (such as methyl, ethyl, or butyl) or an aromatic hydrocarbon (such as phenyl). R in formula (I) can comprise an unsaturated group (such as vinyl).

R can be a hydrocarbon group having 1 to 8, or 1 to 5, carbon atoms. The polysiloxane particles can have a methylated coating, wherein R is methyl. Specifically mentioned polysiloxane particles comprise methylsilsesquioxane particles.

The polysiloxane particles can have the formula (II).

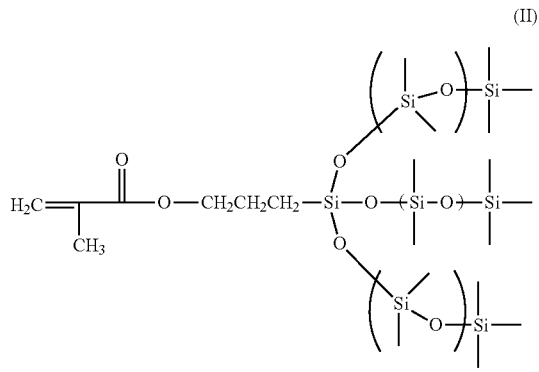

(II)

Suitable polysiloxane particles are "Tospearl" silicone resin particles commercially available from Momentive Performance Materials Japan LLC, E+ Spherical Silicone Resins commercially available from Coating Products OHZ e.K. of Osterholz-Scharmbeck, or E-Powders commercially available from Dow Corning. These particles can have a three-dimensional network structure, in which each silicone atom is bonded to one methyl group.

The composition comprises a fluoropolymer. The composition can comprise 0.001 to 5 wt %, or 0.005 to 4 wt %, or 0.5 to 3 wt % of the fluoropolymer based on the total weight of the composition. The composition can have a low concentration of the fluoropolymer. For example, the composition can comprise 0.001 to 1 wt %, or 0.005 to 1 wt %, or 0.005 to 0.075 wt % of the fluoropolymer based on the total weight of the composition. The composition can have a fluorine content of less than or equal to 500 parts per million by weight (ppm), or less than or equal to 300 ppm, or 5 to 300 ppm based on the total weight of the composition. The fluoropolymer can be a homopolymer or a copolymer that can comprise structural units derived from one or more fluorinated alpha-olefin monomers, that is, an alpha-olefin monomer that includes at least one fluorine atom in place of a hydrogen atom. The fluoropolymer can comprise structural units derived from two or more fluorinated alpha-olefin, for example, tetrafluoroethylene and hexafluoroethylene. The fluoropolymer can comprise structural units derived from one or more fluorinated alpha-olefin monomers and one or more non-fluorinated monoethylenically unsaturated monomers that are copolymerizable with the fluorinated monomers, for example, alpha-monoethylenically unsaturated copolymerizable monomers such as ethylene, propylene, butene, acrylate monomers (e.g., methyl methacrylate or butyl acrylate), or vinyl ether monomers (e.g., cyclohexyl vinyl ether, ethyl vinyl ether, n-butyl vinyl ether, or vinyl ester). Specific examples of fluoropolymers include a polytetrafluoroethylene, a polyhexafluoropropylene, a poly(vinylidene fluoride), a polychlorotrifluoroethylene, an ethylene tetrafluoroethylene copolymer, a fluorinated ethylene-propylene copolymer, a poly(vinyl fluoride), or an ethylene chlorotrifluoroethylene copolymer. Combinations comprising at least one of the foregoing fluoropolymers can also be used. The fluoropolymer can comprise at least one of polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, or ethylene chlorotrifluoroethylene. The fluoropolymer can comprise polytetrafluoroethylene (PTFE).

At least a portion of the fluoropolymer can comprise an encapsulated fluoropolymer that is encapsulated with an encapsulating polymer. The encapsulating polymer can comprise at least one of an acrylic polymer, an acrylonitrile butadiene styrene (ABS) resin, an aromatic polyester, a ($C_{1-8}$ alkyl) (meth)acrylates, an ethylene propylene copolymer, an ethylene-vinyl acetate copolymer, a liquid crystalline polymer, a polyacetal, a polyacrylonitrile, a poly(alkenyl aromatic) polymer, a polyamide, a polybutadiene, a polycarbonate, a polyester, a polyetherimide, a poly(ether ketone), a poly(ether ether ketone), a polyethersulfone, a polyimide, a poly(phenylene ether), a polyolefin, a poly(phenylene ether), a poly(phenylene sulfide), a polysiloxane, a polystyrene, a polysulfone, a polyurethane, a poly(vinylidene halide), or a vinyl polymer (e.g., poly(vinyl alcohol), poly (vinyl acetate), or poly(vinyl fluoride)). The encapsulating polymer can comprise at least one of a styrene-acrylonitrile copolymer, an acrylonitrile-butadiene-styrene copolymer, an alpha-alkyl-styrene-acrylonitrile copolymer, an alpha-methylstyrene-acrylonitrile copolymer, a styrene-butadiene rubber, or a methyl methacrylate copolymer. The encapsulating polymer can comprise a styrene-acrylonitrile copolymer.

The encapsulated fluoropolymer can be encapsulated with a rigid copolymer, for example, a styrene-acrylonitrile copolymer (SAN). PTFE encapsulated in SAN is known as TSAN. Encapsulated fluoropolymers can be made by polymerizing the encapsulating polymer in the presence of the fluoropolymer, for example, in an aqueous dispersion. The TSAN can comprise 40 to 60 wt % PTFE and 40 to 60 wt % SAN, based on the total weight of the encapsulated fluoropolymer. The SAN can comprise, for example, 60 to 80 wt % styrene and 20 to 40 wt % acrylonitrile based on the total weight of the SAN copolymer. Alternatively, the fluoropolymer can be pre-blended in some manner with a second polymer, for example, an aromatic polycarbonate or SAN to form the encapsulated fluoropolymer.

The composition can comprise the encapsulated fluoropolymer in the form of a fibrillated fluoropolymer. The fibrillated fluoropolymer can have an average fibril diameter of greater than or equal to 20 nm, or 20 to 200 nm, or 5 to 500 nm, or 10 to 200 nm, or 20 to 100 nm. The fibril diameter can be determined by using acquired SEM images, in a batch processing manner over all images after de-noising and normalization. Firstly, the fiber detection can be performed with a fixed threshold on the pre-processed images, which changes the original gray-level images to binary images. To evade the fiber entanglement, regional analysis can be conducted instead of separating the individual fiber branches from fiber networks. The inner-boundary distance can be calculated for each region covered by the detected fibers. In the images, the distance can grow from the edge of the detected region towards the nearest nonzero pixels in the binary image based on Fast Marching Method (FMM) (R. van Uitert and I. Bitter, Medical Physics, 34 (2), 2007), where the distance is initiated as zero at the edge and penetrated with the Euclidean distance growing ($D=\sqrt{(x-y)^2}$) towards the next neighbor. Based on the distance map, the centerline of each of the branches can be derived, which can be located at local maxima of the distance map. As such, the crossings of fibers can also be identified as the connection of different branches. The width of each branch can then be calculated along the centerlines over the distance map, avoiding the crossings.

An additive composition can be used, comprising one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble or non-soluble in polycarbonate. The additive composition can include at least one of an impact modifier, flow modifier, filler (e.g., a particulate polytetrafluoroethylene (PTFE), glass, carbon (such as carbon black, carbon nanotubes, or carbon fibers), mineral (such as titanium dioxide, optionally comprising a coating), or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, or radiation stabilizer. The composition can comprise at least one of a carbon filler and titanium dioxide. In general, the additives are used in the amounts generally known to be effective. For example, the total amount of the additive composition (other than any impact modifier, filler, or reinforcing agent) can be 0.001 to 10 wt %, or 0.01 to 5 wt %, each based on the total weight of the polymer in the composition.

The composition can comprise a plurality of carbon nanotubes. The composition can comprise 2 to 10 wt % of a plurality of carbon nanotubes based on the total weight of the composition.

The carbon nanotubes can comprise a plurality of at least one of single wall carbon nanotubes (SWNTs) or multiwall carbon nanotubes (MWNTs). The carbon nanotubes can be produced by laser-evaporation of graphite or carbon arc synthesis. The carbon nanotubes can have an outer diameters of 0.7 to 2.4 nm. The carbon nanotubes can have an aspect ratio (length over outer diameter) of greater than or equal to 5 to 10,000, or greater than or equal to 100, or greater than or equal to 1,000. The carbon nanotubes can have a hollow central portion or the central portion can be filled with amorphous carbon.

The carbon nanotubes can be present in the form of rope-like-aggregates. These aggregates are commonly termed "ropes" and are formed as a result of Van der Waal's forces between the individual carbon nanotubes. The individual nanotubes in the ropes can slide against one another and rearrange themselves within the rope in order to minimize the free energy. The ropes can comprise 10 and $10^5$ nanotubes, or 100 to $10^4$, or 500 to $10^3$. The ropes can have an aspect ratio (length over outer diameter) of greater than or equal to 5 to 10,000, or greater than or equal to about 100, or greater than or equal to 1,000.

The carbon nanotubes can have an inherent thermal conductivity of at least 2,000 Watts per meter Kelvin (W/m-K). The carbon nanotubes can have an inherent electrical conductivity of $10^4$ Siemens/centimeter (S/cm). The carbon nanotubes can have a tensile strength of at least 80 gigapascals (GPa). The carbon nanotubes can have a stiffness of 0.5 terapascals (TPa).

The carbon nanotubes can be functionalized to improve compatibility in the composition. The carbon nanotubes can be functionalized on at least one of a sidewall or a hemispherical endcap. The carbon nanotubes can be functionalized with a reactive group (such as a hydroxyl group or an amine group) that can react with a terminal group of at least one of a polycarbonate or a polysiloxane. The carbon nanotubes can be functionalized by contacting the carbon nanotubes with a strong oxidizing agent for a period of time sufficient to oxidize the surface of the carbon nanotubes and further contacting the carbon nanotubes with a reactant suitable for adding a functional group to the oxidized surface. The oxidizing agent can comprise a solution of an alkali metal chlorate in a strong acid. The alkali metal chlorate can comprise at least one of sodium chlorate or potassium chlorate. The strong acid can comprise sulfuric acid. Periods of time sufficient for oxidation can be 0.5 to 24 hours.

The composition can be free of (for example, can comprise 0 to 0.1 wt %, or 0 wt % based on the total weight of the composition) an impact modifier. For example, the composition can be free of natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like.

The composition can be free of (for example, can comprise 0 to 0.1 wt %, or 0 wt % based on the total weight of the composition) a flame retardant. For example, the composition can be free of an organic compound that include phosphorus, bromine, or chlorine; a non-brominated and non-chlorinated phosphorus-containing flame retardant, for example, organic phosphates and organic compounds containing phosphorus-nitrogen bonds; or an inorganic flame retardant.

Examples of organic phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. Specific examples of organic phosphates include triphenyl phosphate, tricresyl phosphate, isopropylated triphenyl phosphate, and the like.

Examples of compounds containing phosphorus-nitrogen bonds include phosphazenes, phosphonitrilic chloride, phosphorus ester amides, phosphoric acid amides, phosphonic acid amides, phosphinic acid amides, tris(aziridinyl) phosphine oxide, and the like.

Examples of inorganic flame retardants include salts of $C_{2-16}$ alkyl sulfonates such as potassium perfluorobutane sulfonate (Rimar salt), potassium perfluorooctane sulfonate, and tetraethylammonium perfluorohexane sulfonate, salts of aromatic sulfonates such as sodium benzene sulfonate, sodium toluene sulfonate (NATS), and the like; salts of aromatic sulfone sulfonates such as potassium diphenylsulfone sulfonate (KSS), and the like; salts formed by reacting for example an alkali metal or alkaline earth metal (e.g., lithium, sodium, potassium, magnesium, calcium, and barium salts) and an inorganic acid complex salt, for example, an oxo-anion (e.g., alkali metal and alkaline-earth metal salts of carbonic acid, such as $Na_2CO_3$, $K_2CO_3$, $MgCO_3$, $CaCO_3$, and $BaCO_3$, or a fluoro-anion complex such as $Li_3AlF_6$, $BaSiF_6$, $KBF_4$, $K_3AlF_6$, $KAlF_4$, $K_2SiF_6$, or $Na_3AlF_6$, and the like.

The composition can be free of a brominated polycarbonate, for example, that is derived from tetrabromobisphenol A.

The following examples are provided to illustrate the present disclosure. The examples are merely illustrative and are not intended to limit devices made in accordance with the disclosure to the materials, conditions, or process parameters set forth therein.

EXAMPLES

In the examples, the following test methods were used.

Flammability tests were performed following the procedure of Underwriter's Laboratory Bulletin 94 entitled "Tests for Flammability of Plastic Materials, UL94" with 7 day conditioning. Specimens were preconditioned in an air-circulating oven for 168 hours at 70 degrees Celsius (° C.) and then cooled in the desiccator for at least 4 hours at room temperature, prior to testing. Once removed from the desiccator, specimens were tested within 30 minutes. The data was analyzed by calculation of the average flame out time, standard deviation of the flame out time and the total number of drips. Statistical methods were used to convert the data to a probability that a specific formulation would achieve a first time V0 pass ("p(FTP)") in the standard UL94 testing of 5 bars. In order to achieve a V0 rating, the p(FTP) values was 1 or close to 1, for example, 0.9 to 1 for high confidence that a sample formulation would achieve a V0 rating in UL94 testing. A p(FTP) value below 0.85 for a sample formulation was considered too low to predict a UL94 rating of V0 for that formulation.

Microscale combustion calorimetry (MCC) testing was performed in accordance with ASTM D7309-13, method A, where the material was decomposed in a furnace subjected to a high temperature ramp of 1° C./s. The decomposition products were mixed with an oxygen/nitrogen gas mixture to facilitate combustion. The oxygen concentration and flow rates of the combustion gases were monitored, and oxygen consumption calorimetry was used to calculate the amount of generated heat.

Heat release testing was performed on 15.2×15.2 centimeter (cm) plaques 1.5 mm thick using the OSU rate-of-heat release apparatus, in accordance with the method shown in FAR 25.853 (d), and in Appendix F, section IV (FAR F25.4). The heat release test method is also described in the "Aircraft Materials Fire Test Handbook" DOT/FAA/AR-00/12, Chapter 5 "Heat Release Test for Cabin Materials." In order to obtain a "pass" for the 65/65 test, the two-minute total heat release had to be less than or equal to 65 kW-min/m$^2$ and the peak heat release rate had to be less than or equal to 65 kW/m$^2$. In order to obtain a "pass" for the 55/55 test, the two-minute total heat release had to be less than or equal to 55 kW-min/m$^2$ and the peak heat release rate had to be less than or equal to 55 kW/m$^2$.

Smoke density testing was performed in accordance with ISO 5659-2:2017, where the smoke density after 4 minutes (DS4) and the integral of the smoke density as a function of time up to 4 minutes (VOF4) were measured on a 3 mm thick plaque. "Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g., in underground rail cars). In order to achieve a hazard level 3 rating (HL3), the value of DS4 needs to be less than 150 kW/m$^2$ and the VOF4 needs to be less than 300 kW/m$^2$.

The materials listed in Table 1 were used in the below examples.

TABLE 1

| Material | Description | Source |
|---|---|---|
| FST3403 | A high flow PC Copolymer having a mass flow rate of 12 g/10 min determined in accordance with ASTM D1238 300° C./1.2 kg | SABIC's Innovative Plastics business |
| FST9405 | A high flow PC Copolymer having a mass flow rate of 9 g/10 min determined in accordance with ASTM D1238 300° C./1.2 kg | SABIC's Innovative Plastics business |
| SiO particles | Polysiloxane particles, SP-TOS-2, Tospearl 120 FL having particle size of 2 micrometers and a surface area of 2.27 meters squared per gram (m$^2$/g) | Momentive Performance Materials |
| Nanosilica | CAB-O-SIL TS-720, a fumed silica coated with poly(dimethyl siloxane) having an average particle size of 20 nanometers | Cabot Corporation |
| TSAN | PTFE encapsulated in SAN (50 wt % PTFE and 50 wt % SAN based on the total weight of the TSAN) | SABIC's Innovative Plastics business |
| PTFE | Algoflon DF Virgin-DF210 | Solvay Specialty Polymers |
| Coated TiO$_2$ | Kronos 2233 | Kronos International Inc. |
| Carbon black | Cabot Monarch 800 | Cabot Corporation |

The polysiloxane particles from Momentive have a methylated coating.

Example 1: Flame Retardancy in Accordance with the UL94 Test

Eight compositions were prepared according to Table 2 and flame tests according the UL94 were performed on each of the examples.

TABLE 2

| Composition | 1 | 2 | 3 | 4 | 5 | 6 | 7 | 8 | 18 |
|---|---|---|---|---|---|---|---|---|---|
| FST9405 (wt %) | 100 | 98 | 97 | 98 | 94.5 | 93 | — | — | 94.925 |
| FST3403 (wt %) | — | — | — | — | — | — | 100 | 93 | — |
| SiO particles (wt %) | — | 2 | — | — | 2 | 2 | — | 2 | 2 |
| Nanosilica (wt %) | — | — | 3 | — | 3 | 3 | — | 3 | 3 |
| TSAN (wt %) | — | — | — | 2 | 0.5 | 2 | — | 2 | 0.075 |

TABLE 2-continued

| Composition | 1 | 2 | 3 | 4 | 5 | 6 | 7 | 8 | 18 |
|---|---|---|---|---|---|---|---|---|---|
| Flame Rating at 0.8 mm | | | | | | | | | |
| UL94 | V0 | V0 | V2 | V0 | V0 | V0 | V0 | V0 | V0 |
| p(FTP) for UL94-V0 | 1.00 | 1.00 | 0.57 | 1.00 | — | 1.00 | 0.55 | 1.00 | 1.00 |
| Flame Rating at 0.6 mm | | | | | | | | | |
| UL94 | V2 | V2 | — | V0 | V0 | V0 | — | V0 | V0 |
| p(FTP) for UL94-V0 | — | — | — | 1.00 | 1.00 | 1.00 | — | 1.00 | 1.00 |
| Total flame out time 20 bars (s) | — | — | — | 24 | 8 | 7 | — | 11 | 51 |
| Flame Rating at 0.4 mm | | | | | | | | | |
| UL94 | — | — | — | V0 | V0 | V0 | — | V0 | V2 |
| p(FTP) for UL94-V0 | — | — | — | 0.99 | 1.00 | 1.00 | — | 0.95 | — |
| Total flame out time 20 bars (s) | — | — | — | 55 | 42 | 22 | — | 50 | — |

Table 2 shows that Composition 1 and Composition 7 comprising 100 wt % of the polycarbonate copolymer were only capable of achieving a UL94 V0 rating at 0.8 mm and that neither of Composition 2 or Composition 3 comprising only one of the polysiloxane nanoparticles and the nanosilica were capable of achieving the UL94 V0 rating at 0.6 mm. All of Composition 4, Composition 5, Composition 6, and Composition 8 were capable of achieving the UL94 V0 rating at 0.4 mm. While Composition 18 containing 0.075 wt % TSAN did not achieve the UL94 V0 rating at 0.4 mm, it was capable of achieving the UL94 V0 rating at 0.6 mm.

Example 2: Heat Release Testing Using Microscale Combustion Calorimetry

Compositions were prepared according to Table 3 and microscale combustion calorimetry tests were performed on each of the examples. Table 3 reports the resultant peak heat release rate (PHRR) in watts per gram (W/g) and total heat release (total HR) in kilojoules per gram (kJ/g). The MCC technique can provide a more quantitative assessment of polymer flammability than the UL94 test methods.

TABLE 3

| | Composition | | | | | |
|---|---|---|---|---|---|---|
| | 7 | 9 | 10 | 11 | 12 | 8 |
| FST3403 (wt %) | 100 | 98 | 97 | 98 | 95 | 93 |
| SiO particles (wt %) | — | 2 | — | — | 2 | 2 |
| Nanosilica (wt %) | — | — | 3 | — | 3 | 3 |
| TSAN (wt %) | — | — | — | 2 | — | 2 |
| Char (wt %) | 39 | 40 | 41 | 39 | 42 | 43 |
| Peak Temperature (° C.) | 522 | 518 | 524 | 522 | 520 | 519 |
| PHRR (W/g) | 193 | 177 | 181 | 171 | 184 | 164 |
| Total HR (kJ/g) | 10 | 10 | 10 | 10 | 10 | 9 |

Table 3 shows that only Composition 8, comprising all of the polysiloxane particles, the nanosilica, and the encapsulated fluoropolymer was capable of achieving a peak heat release rate of less than 170 W/g.

Example 3: OSU Heat Release Testing

Compositions were prepared according to Table 4 and OSU heat release tests were performed on each of the examples. Table 4 reports the resultant peak heat release rate in kilowatts per meters squared (kW/m$^2$) and total heat release (total HR) in kilowatts per minute per meters squared kW-min/m$^2$.

TABLE 4

| | Composition | | | | | | | | | | |
|---|---|---|---|---|---|---|---|---|---|---|---|
| | 1 | 2 | 3 | 3-1 | 4 | 13 | 14 | 6 | 15 | 16 | 17 |
| FST9405 (wt %) | 100 | 98 | 97 | 97 | 98 | 95 | 95 | 93 | 94 | 97.99 | 90.99 |
| SiO particles (wt %) | — | 2 | — | — | — | 2 | — | 2 | 2 | — | 2 |
| Nanosilica (wt %) | — | — | 3 | 3 | — | 3 | 3 | 3 | 3 | — | 3 |
| TSAN (wt %) | — | — | — | — | 2 | — | 2 | 2 | — | — | 2 |
| PTFE (wt %) | — | — | — | — | — | — | — | — | — | 1 | — |

TABLE 4-continued

| | Composition | | | | | | | | | | |
|---|---|---|---|---|---|---|---|---|---|---|---|
| | 1 | 2 | 3 | 3-1 | 4 | 13 | 14 | 6 | 15 | 16 | 17 |
| Coated $TiO_2$ (wt %) | — | — | — | — | — | — | — | — | — | 2 | 2 |
| Carbon black (wt %) | — | — | — | — | — | — | — | — | — | 0.01 | 0.01 |
| PHRR ($kW/m^2$) | 62.6 | 46.8 | 53.1 | 42.9 | 59.7 | 52.5 | 43.7 | 52.4 | 61.2 | 46.8 | 60.3 |
| Total HR at 2 min (kW-min/$m^2$) | 60.1 | 35.4 | 38.5 | 27.2 | 48.6 | 49.8 | 41.2 | 45.7 | 37.9 | 36.4 | 33.7 |

Table 4 shows that all of the compositions of Table 4 were capable of passing the OSU 65/65 or the OSU 55/55 tests.

Example 4: Smoke Density Testing

Compositions were prepared according to Table 5 and smoke density tests were performed on each of the examples.

TABLE 5

| | Composition | | | | | | | | | | |
|---|---|---|---|---|---|---|---|---|---|---|---|
| | 1 | 2 | 3 | 18 | 4 | 6 | 19 | 7 | 8 | 5 | 18 |
| FST9405 (wt %) | 100 | 98 | 97 | 96 | 98 | 93 | 94 | — | — | 94.5 | 94.925 |
| FST3403 (wt %) | — | — | — | — | — | — | — | 100 | 93 | — | — |
| SiO particles (wt %) | — | 2 | — | — | — | 2 | 2 | — | 2 | 2 | 2 |
| Nanosilica (wt %) | — | — | 3 | 4 | — | 3 | 3 | — | 3 | 3 | 3 |
| TSAN (wt %) | — | — | — | — | 2 | 2 | — | — | 2 | 0.5 | 0.075 |
| PTFE (wt %) | — | — | — | — | — | — | 1 | — | — | — | — |
| DS4 (50 $kW/m^2$) (HL3 < 150 $kW/m^2$) | 179 | 97 | 71 | 93 | 309 | 239 | 202 | 137 | 282 | 298 | 59 |
| VOF4 (50 $kW/m^2$) (HL3 < 300 $kW/m^2$) | 260 | 183 | 143 | 215 | 429 | 350 | 313 | 234 | 461 | 473 | 125 |
| Classification | HL2 | HL3 | HL3 | HL3 | HL1 | HL2 | HL2 | HL3 | HL2 | HL2 | HL3 |

Tables 2 and 5 show that Composition 18 that comprises only 0.075 wt % of TSAN was capable of not only achieving the improved UL94 V0 performance at 0.6 mm, but it is capable of achieving an HL3 rating.

Set forth below are various, non-limiting aspects of the disclosure.

Aspect 1: A composition comprising a poly(ester-carbonate-siloxane) copolymer; a nanosilica; a plurality of polysiloxane particles; and a fluoropolymer. The nanosilica can be present in an amount of 1 to 5 wt % based on a total weight of the composition. The nanosilica can have a $D_{50}$ particle size by volume of 5 to 50 nanometers. The nanosilica can have a hydrophobic coating. The plurality of polysiloxane particles can be present in an amount of 1 to 10 wt % based on a total weight of the composition. The plurality of polysiloxane particles can have a $D_{50}$ particle size by volume of 0.1 to 10 micrometers. The fluoropolymer can be present in an amount of 0.005 to 5 wt % based on a total weight of the composition.

Aspect 2: The composition of Aspect 1, wherein the composition has a ULV0 rating at a thickness of 0.8 mm, or 0.6 mm, or 0.4 mm.

Aspect 3: The composition of any one or more of the preceding aspects, wherein the composition has a 2 minute integrated heat release rate of less than or equal to 55 kW-min/$m^2$ and a peak heat release rate of less than 55 kW/$m^2$ in accordance with the OSU 55/55 test.

Aspect 4: The composition of any one or more of the preceding aspects, wherein the composition has a peak heat release rate of less than 170 watts per gram as determined in accordance with ASTM D7309-13, method A at a temperature ramp of 1° C./s.

Aspect 5: The composition of any one or more of the preceding aspects, wherein the composition has a smoke density after 4 minutes of less than 150 kW/$m^2$ and an integral of the smoke density as a function of time up to 4 minutes of less than 300 kW/$m^2$ determined in accordance with ISO 5659-2 using on a 3 mm thick plaque.

Aspect 6: The composition of any one or more of the preceding aspects, wherein the composition comprises 60 to 99 wt %, or 85 to 98 wt %, or 90 to 95 wt % of the poly(ester-carbonate-siloxane) based on the total weight of the composition.

Aspect 7: The composition of any one or more of the preceding aspects, wherein the poly(ester-carbonate-siloxane) comprises bisphenol A carbonate units, isophthalate-terephthalate-bisphenol A ester units, and siloxane units.

Aspect 8: The composition of any one or more of the preceding aspects, wherein the composition comprises 2.5 to 4.5 wt %, or 3 to 4 wt % of the nanosilica based on the total weight of the composition.

Aspect 9: The composition of any one or more of the preceding aspects, wherein the nanosilica has a $D_{50}$ particle size by volume of 5 to 40 nm, or 15 to 25 nm.

Aspect 10: The composition of any one or more of the preceding aspects, wherein the hydrophobic coating comprises a polysiloxane graft.

Aspect 11: The composition of any one or more of the preceding aspects, wherein the composition comprises 1 to 5 wt %, or 2 to 6 wt % of the plurality of polysiloxane particles.

Aspect 12: The composition of any one or more of the preceding aspects, wherein the plurality of polysiloxane particles has a $D_{50}$ particle size of 1 to 5 micrometers.

Aspect 13: The composition of any one or more of the preceding aspects, wherein the plurality of polysiloxane particles has a methylated coating.

Aspect 14: The composition of any one or more of the preceding aspects, wherein the fluoropolymer comprises an encapsulated fluoropolymer.

Aspect 15: The composition of any one or more of the preceding aspects, wherein the encapsulated fluoropolymer comprises a styrene acrylonitrile encapsulated polytetrafluoroethylene.

Aspect 16: The composition of any one or more of the preceding aspects, wherein the fluoropolymer comprises a fibrillated fluoropolymer having an average fibril diameter of greater than or equal to 20 nm, or 20 to 200 nm, or 5 to 500 nm, or 10 to 200 nm, or 20 to 100 nm.

Aspect 17: The composition of any one or more of the preceding aspects, wherein the composition further comprises at least one of a carbon additive or a coated titanium dioxide.

Aspect 18: The composition of any one or more of the preceding aspects, wherein the composition is free of a flame retardant.

Aspect 19: The composition of any one or more of the preceding aspects, wherein the composition comprises 0.001 to 1 wt %, or 0.005 to 1 wt %, or 0.005 to 0.075 wt % of the fluoropolymer based on the total weight of the composition.

Aspect 20: The composition of any one or more of the preceding aspects, wherein the composition has a fluorine content of less than or equal to 500 ppm, or less than or equal to 300 ppm, or 5 to 300 ppm based on the total weight of the composition.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an embodiment", "another embodiment", "some embodiments", "an aspect", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments or aspects. "Optional" or "optionally" means that the subsequently described event or circumstance may or may not occur, and that the description includes instances where the event occurs and instances where it does not.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

Unless defined otherwise, technical and scientific terms used herein have the same meaning as is commonly understood by one of skill in the art to which this invention belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted $C_{1-10}$ alkyl" refers to a $C_{1-10}$ alkyl group substituted with $C_{6-12}$ aryl group, the total number of carbon atoms in the resulting aryl-substituted alkyl group is $C_{7-22}$.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising:
    a poly(ester-carbonate-siloxane) copolymer;
    1 to 5 wt % based on a total weight of the composition of a nanosilica having a $D_{50}$ particle size by volume of 5 to 50 nanometers; wherein the nanosilica has a hydrophobic coating;
    1 to 10 wt % based on a total weight of the composition of a plurality of polysiloxane particles having a $D_{50}$ particle size by volume of 0.1 to 10 micrometers; and 0.005 to less than 0.5 wt % based on a total weight of the composition of a fluoropolymer, wherein the composition has a smoke density after 4 minutes of less than 150 kW/m2 and an integral of the smoke density as a function of time up to 4 minutes of less than 300 kW/m2 determined in accordance with ISO 5659-2 using a 3 mm thick plaque.

2. The composition of claim 1, wherein the composition passes one or more of:
a ULV0 rating at a thickness of 0.8 mm, or 0.6 mm, or 0.4 mm;
a 2 minute integrated heat release rate of less than or equal to 55 kW-min/m$^2$ and a peak heat release rate of less than 55 kW/m$^2$ in accordance with the OSU 55/55 test; or
a peak heat release rate of less than 170 watts per gram as determined in accordance with ASTM D7309-13, method A at a temperature ramp of 1° C./s.

3. The composition of claim 1, wherein the composition comprises 60 to 99 wt %, or 85 to 98 wt %, or 90 to 95 wt % of the poly(ester-carbonate-siloxane) based on the total weight of the composition.

4. The composition of claim 1, wherein the poly(ester-carbonate-siloxane) comprises bisphenol A carbonate units, isophthalate-terephthalate-bisphenol A ester units, and siloxane units.

5. The composition of claim 1, wherein the composition comprises 2.5 to 4.5 wt %, or 3 to 4 wt % of the nanosilica based on the total weight of the composition.

6. The composition of claim 1, wherein the nanosilica has a $D_{50}$ particle size by volume of 5 to 40 nm, or 15 to 25 nm.

7. The composition of claim 1, wherein the hydrophobic coating comprises a polysiloxane graft.

8. The composition of claim 1, wherein the composition comprises 1 to 5 wt %, or 2 to 6 wt % of the plurality of polysiloxane particles.

9. The composition of claim 1, wherein the plurality of polysiloxane particles has a $D_{50}$ particle size of 1 to 5 micrometers.

10. The composition of claim 1, wherein the plurality of polysiloxane particles has a methylated coating.

11. The composition of claim 1, wherein the fluoropolymer comprises an encapsulated fluoropolymer.

12. The composition of claim 1, wherein the encapsulated fluoropolymer comprises a styrene acrylonitrile encapsulated polytetrafluoroethylene.

13. The composition of claim 1, wherein the fluoropolymer comprises a fibrillated fluoropolymer having an average fibril diameter of greater than or equal to 20 nm, or 20 to 200 nm, or 5 to 500 nm, or 10 to 200 nm, or 20 to 100 nm.

14. The composition of claim 1, wherein the composition further comprises at least one of a carbon additive or a coated titanium dioxide.

15. The composition of claim 1, wherein the composition is free of a flame retardant.

16. The composition of claim 1, wherein the composition comprises from 0.005 to less than 0.1 wt % based on a total weight of the composition of the fluoropolymer.

* * * * *